United States Patent [19]
Korpi

[11] Patent Number: 5,957,495
[45] Date of Patent: Sep. 28, 1999

[54] VEHICLE EXHAUST ORIENTATION ASSEMBLY

[75] Inventor: John G. Korpi, Wayne County, Mich.

[73] Assignee: The United States of America as represented by the Secretary of the Army, Washington, D.C.

[21] Appl. No.: 09/208,152

[22] Filed: Nov. 9, 1998

[51] Int. Cl.[6] .............................. B60R 9/18; F01N 7/00
[52] U.S. Cl. ............................................. 280/762; 60/324
[58] Field of Search ................................. 180/309, 296; 280/762; 454/367, 299; 60/324, 317

[56] References Cited

U.S. PATENT DOCUMENTS

| | | | |
|---|---|---|---|
| 1,189,572 | 7/1916 | Ilg | 454/367 |
| 1,442,196 | 1/1923 | Truelson | 55/30 |
| 2,678,067 | 5/1954 | Russel | 60/324 |
| 4,069,668 | 1/1978 | Oldberg | 60/317 |
| 4,785,596 | 11/1988 | Wiley et al. | 52/302 |
| 4,903,484 | 2/1990 | Yates et al. | 60/316 |
| 4,970,859 | 11/1990 | Yates et al. | 60/324 |
| 5,323,609 | 6/1994 | Konrath et al. | 60/324 |

FOREIGN PATENT DOCUMENTS 404015125   1/1992   Japan ..................................... 180/309

*Primary Examiner*—Lanna Mai
*Assistant Examiner*—Michael Britton
*Attorney, Agent, or Firm*—Peter A. Taucher; David L. Kuhn

[57] ABSTRACT

A vehicle exhaust orientation assembly directs an extremely hot, forceful exhaust gas flow from a tank or other vehicle that is towing a trailer or the like. The assembly has a transition shroud affixed to the exterior of the vehicle over its exhaust portal. A drum is rotatably connected to the shroud by rollers on the drum which engage a track on the shroud. Several anchoring structures are mounted on the shroud about the drum. The structures can hold the drum in one of several rotational positions of the drum on the shroud. Flow directing fins in the drum are pivoted by a linkage which can engage a tab on the drum so as to lock the fins in a selected pivot position. Rotational force is imparted to the drum and fins by flanges obliquely attached to the fins so that the fins are spun by the exhaust flow from the tank.

9 Claims, 3 Drawing Sheets

VEHICLE EXHAUST ORIENTATION ASSEMBLY

GOVERNMENT USE

The invention described here may be made, used and licensed by or for the U.S. Government for governmental purposes without paying me any royalty.

BACKGROUND AND SUMMARY

The exhaust of turbine powered military vehicles has become a major problem due to the large volumes of very hot air from the turbine engine. A case in point is the M1 series of Abrams tanks currently fielded by the United States Army. In its original design, the M1 tank directed exhaust gases downward through exhaust grills at the rear of the tank. These gases caused large clouds of dust to be kicked up when the tank was operated in a desert setting. Straighteners were added to the exhaust grill to direct the gases horizontally, but problems resulted when an M1 tank was used to tow another vehicle. A deflection device was then designed to be temporarily added to the straightener to deflect the gases upward whenever the M1 tank was towing another vehicle. However, this device adds undesirable extra structure to the tank exhaust outlet and must be carried with the tank when not in use. In addtion, upwardly directed exhaust gas creates an easily detectable thermal signature, which faciltates detection by unfriendly forces.

My invention is an exhaust orientation assembly that replaces the aforementioned straightener and eliminates the need for additional exhaust deflector devices. The assembly comprises a transition shroud affixed to the exhaust grill of a tank or like vehicle. A drum rotates on the shroud by means of a roller-track arrangement between the drum and shroud. Several anchoring structures mount on the shroud in equally spaced locations about the drum. The structures hold the drum in one of several angular positions relative to the shroud. Movable fins for directing exhaust flow through the drum are pivoted by a linkage. A tab on the drum can be engaged by the linkage and thereby lock the fins in a selected pivot position. Rotational force is imparted to the drum and fins by flanges obliquely attached to the fins; when exhaust gas strikes the flanges, the fins and drum spin.

DETAILED DESCRIPTION

Figure 2:
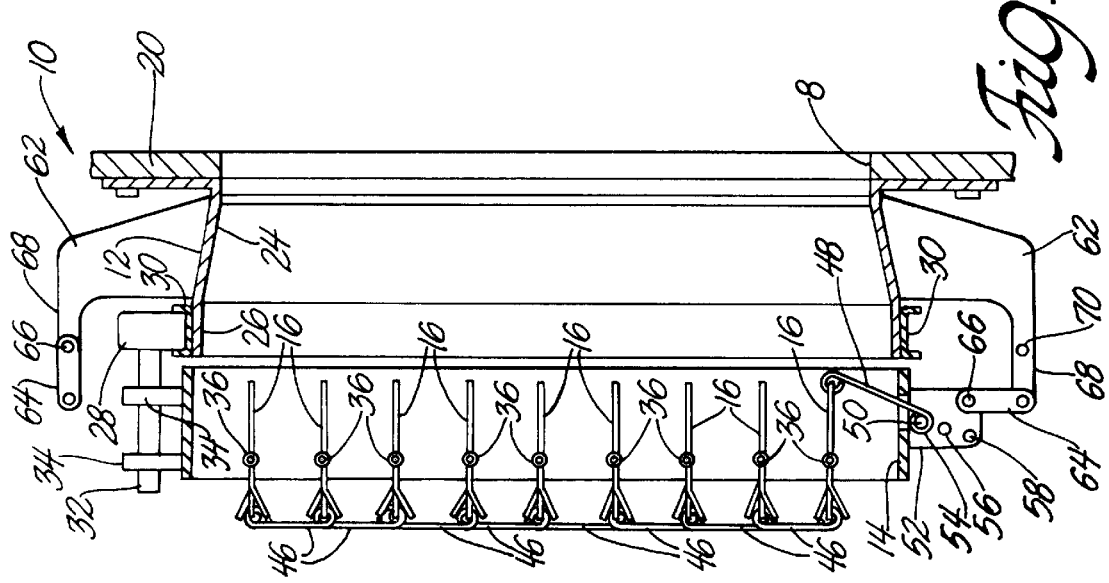
FIG. 2 is a sectional side elevational view of my assembly.
Figure 1:
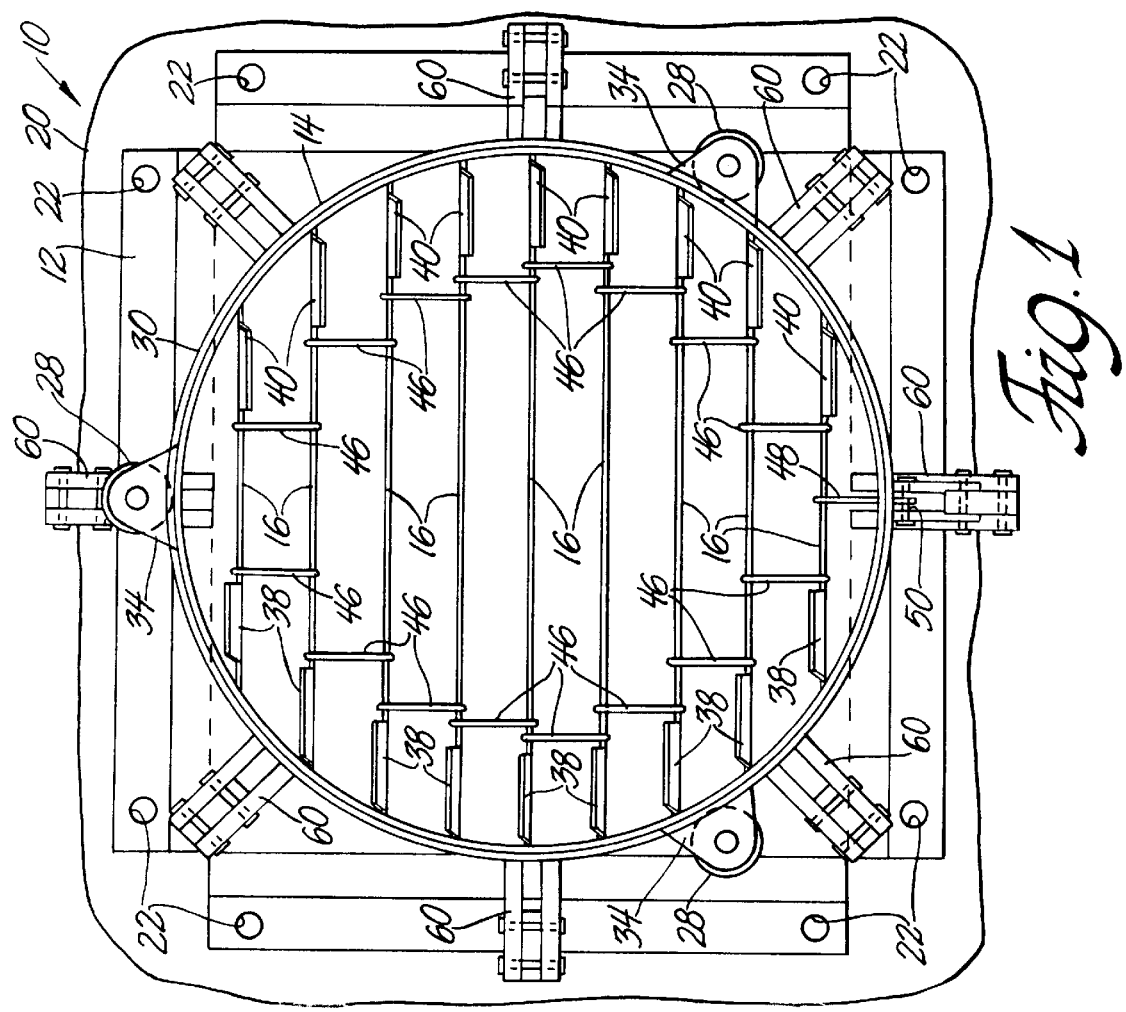
FIG. 1 is a front elevational view of my exhaust orientation assembly.

Shown in FIGS. 1 and 2 is a exhaust orientation assembly 10 for a turbine powered military vehicle having a transition shroud 12 on which rotates an annular drum 14 encircling adjustable louver fins 16. Assembly 10 mounts over the engine exhaust portal 8 of tank 18 (FIG. 3) or other combat vehicle, the portal and assembly typically being at the aft end of tank hull 20. Bolts through shroud apertures 22 can be used to affix assembly 10 to hull 20, although the shroud can also be welded or clamped onto the hull. Exhaust portal 8 is generally rectangular in shape, and the portion 24 of shroud 12 adjacent the portal defines a rectangular opening registering with the portal. Shroud 22 is an adapter in that it transitions from its rectangular shape at the portal to a zone 26 circular shape adjacent drum 14.

Drum 14 is rotatably connected to shroud 12 by means of a set of three rollers 28 engaging a track 30. Each of rollers 28 attaches to a shaft 32 journalled in brackets 34, which are in turn fixed to the exterior of drum 14. Track 30 is an annular channel about shroud zone 26 sized to closely receive rollers 28. The side walls of the annular channel prevent escape of the rollers so that drum 14 remains on shroud 12.

Figure 4:
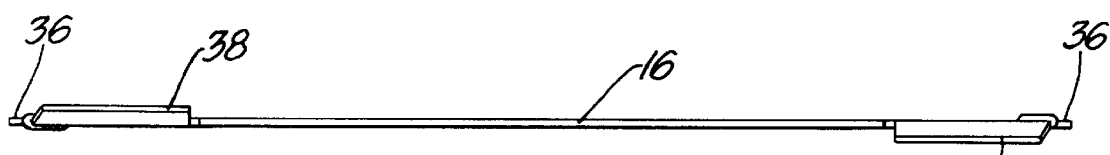
FIG. 4 is a front elevational view of a fin of the exhaust orientation assembly.
Figure 5:
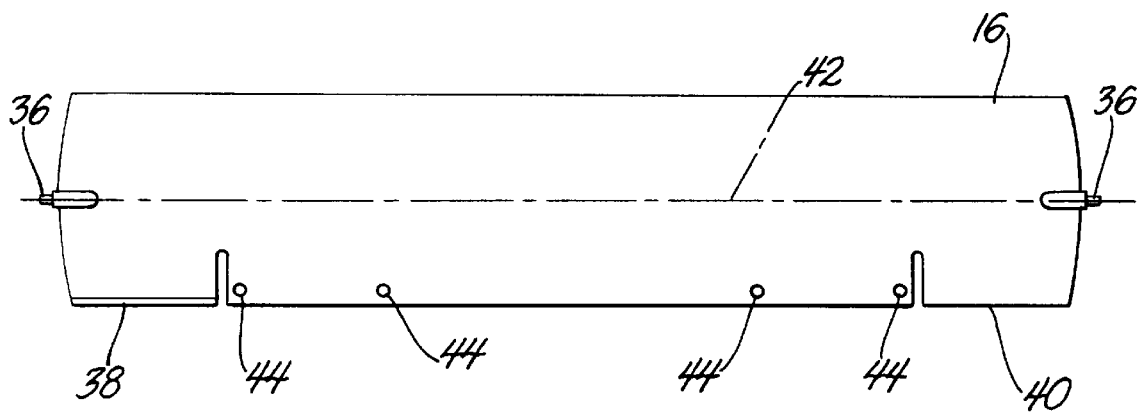
FIG. 5 is a top elevational view of the fin.

Pivotally mounted in drum 14 are pivotable louver fins 16, a typical fin being shown in FIGS. 4 and 5 with the fin's pivot axis 42 shown in FIG. 5. Fins 16 are generally elongate and flat, and have pivot pins 36 at either end that engage drum 14. Along one edge of fin 16 are apertures 44 for accommodating slave links 46 (FIG. 1). Also along one edge of fin 16, at the ends of the fin, are oblique flanges 38 and 40. Flange 38 bends away from fin 16 in one direction and flange 40 bends away from the fin in the opposite direction. When engine exhaust gas impacts the flanges in FIG. 1, the flanges and drum rotate counterclockwise.

Fins 16 can be tilted so as to deflect engine exhaust gas up or down in FIGS. 1 and 2. The fins' tilt angle is governed by moving master link 48, which engages one fin 16 but moves all the fins since slave links 46 connect the fins together. Master link 48 is held in one of a plurality of positions by pin 50 passing through a pair of tabs 52 and an eye 54 of link 48, as seen in FIG. 2. In that figure, one of tabs 52 is removed to allow a better view of eye 54, and master link is positioned so that fins are in a horizontal orientation. Holes 56 and 58 can also accept pin 50 so that eye 54 can be repositioned at those holes and thus tilt fins 16 at varied angles. Typically these angles are respectively 22.5° and 45° from the horizontal in FIG. 2.

Figure 3:
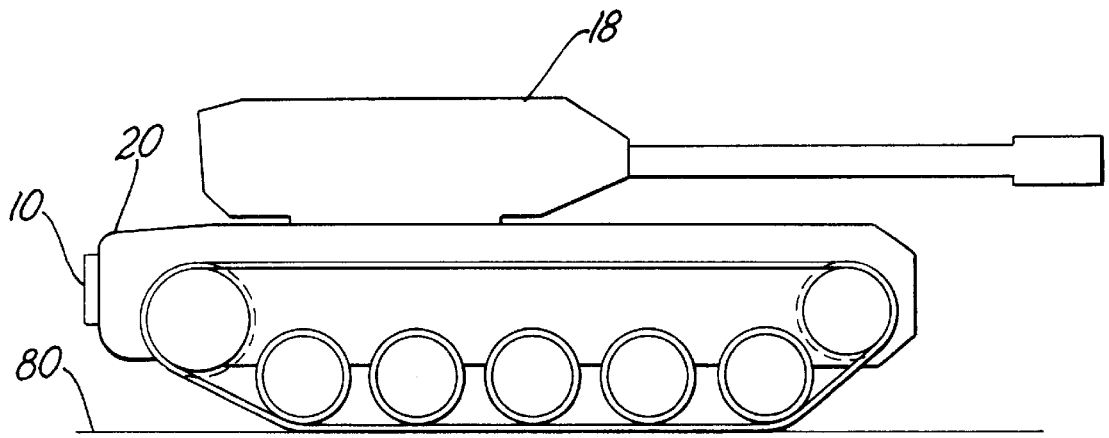
FIG. 3 is a side elevational view of a tank with my assembly installed at the rear of the tank.
Figure 7:
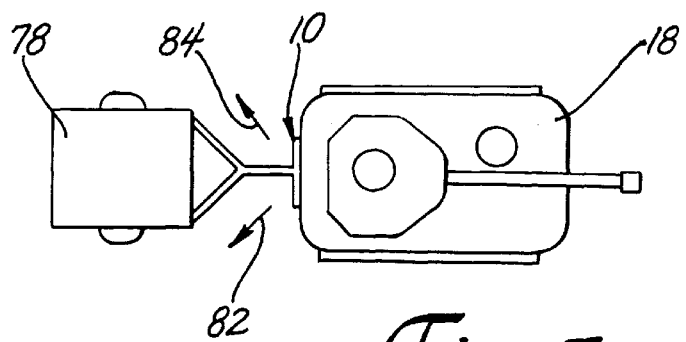
FIG. 7 is a top elevational view of a tank towing a trailer.

Drum 14 can be locked into one of several rotational positions relative to shroud 12 by connecting tab 52 to one of several anchoring structures 60 disposed about the drum and fixed to the shroud. Thus it is possible to direct a powerful flow of extremely hot exhaust gas to the right (arrow 82) or left (arrow 84) of a vehicle 78 towed behind tank 18 shown in FIG. 7, or to direct the exhaust gas away from a potentially dusty ground surface 80 (FIG. 3).

Each anchoring structure comprises a pair of dog legs 62 welded or otherwise fixed to the shroud. Connected between the dog legs at respective ends thereof is a swing arm 64 that can be pivoted between two positions. At a first position, shown in the lower part of FIG. 2, swing arm 64 can be affixed between tabs 52 by pin 66. At a second position, shown in the upper part of FIG. 2, arm 64 swings into registry with dog leg segment 68 and is held in registry by pin 66, which is removed from tab 52 and placed through hole 70. At the second position, arm 64 will not prevent rotation of drum 14 on shroud 12, so that the flow of exhaust gas onto fins 16 turns the drum and dissipates exhaust heat over a wider area than would otherwise occur.

Figure 6:
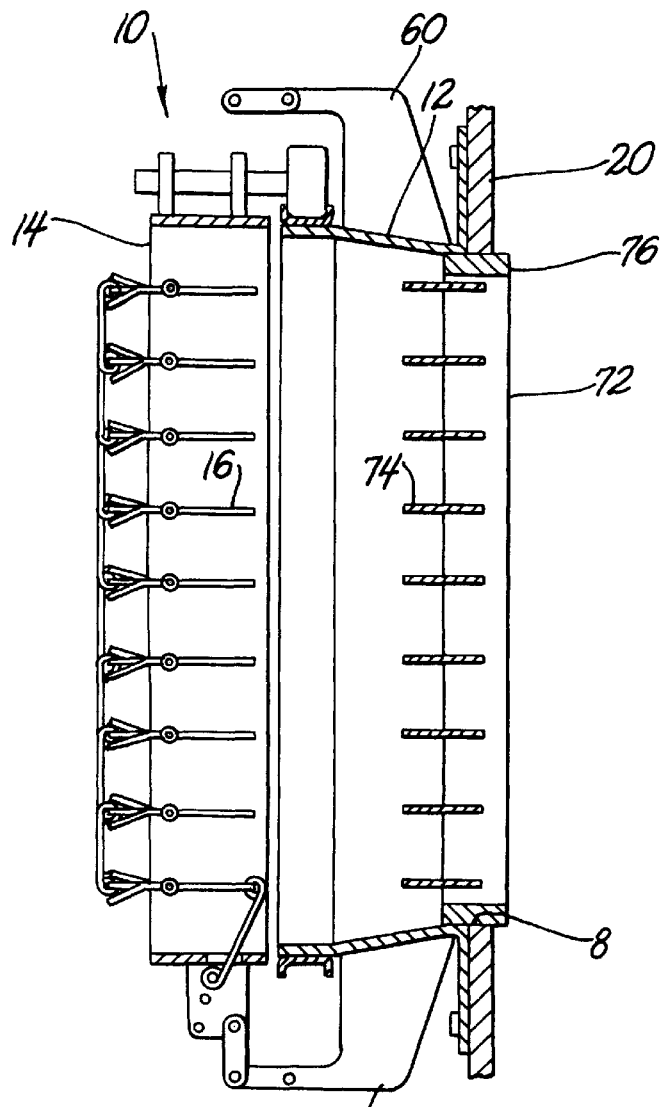
FIG. 6 is a side sectional view of my assembly installed on a conventional tank exhaust grill or grating.

FIG. 6 shows assembly 10 mounted over exhaust portal 8 in an instance when a vehicle conventional exhaust grill or grating 72 has not been removed prior to installing assembly 10. Grating 72 typically has slats 74 fixed relative to the sides of aperture 8 or a grating frame 76. The slats are shown as being disposed horizontally in FIG. 6 but may be disposed at other orientations, such as at a 45 degree angle with respect to the horizontal so as to deflect exhaust gas downward. Note that the depth, or axial dimension, of shroud 12 is sufficient to keep fins 16 clear of slats 74, whereby shroud 12 has the added function of being a spacer.

I wish it to be understood that I do not desire to be limited to the exact details of construction or method shown herein since obvious modifications will occur to those skilled in the relevant arts without departing from the spirit and scope of the following claims.

What is claimed is:

1. An assembly in combination with a vehicle for orienting the flow of exhaust gas exiting from an exhaust portal of the vehicle, the assembly comprising:

a transition shroud affixed to the exterior of the vehicle over the exhaust portal;

a drum;

rollers and track rotatably connecting the drum to the shroud, whereby the drum is rotatable on the shroud;

means for holding the drum in any of a set of rotational positions of the drum relative to the shroud;

fins encircled by the drum;

means for pivoting the fins relative to the drum;

means to lock the fins in a chosen one of a set of pivot positions relative to the drum; and means for imparting rotation to the drum and fins, the imparting means comprising flanges attached to the fins and disposed oblique thereto.

2. The assembly of claim 1 wherein the holding means comprises:

a plurality of members fixed to the shroud and disposed about the drum;

swing arms on the members;

a tab protruding from the drum;

means for connecting one of the swing arms to the tab.

3. The assembly of claim 1 wherein the pivoting means is a means to pivot all the fins in concert and comprises:

slave links connecting the fins; and a master link connected to a selected fin.

4. The assembly of claim 3 further comprising means for backing the fins in a selected pivot position relative to the drum, wherein the retaining means comprises:

a tab on the drum having a plurality of sites for engagement of the master link; and means for releasably fastening the master link to a selected site.

5. The assembly of claim 4 wherein the holding means comprises:

a plurality of members fixed to the shroud and disposed about the drum;

swing arms on the members;

means for connecting one of the swing arms to the tab.

6. The assembly of claim 1 wherein the shroud spaces the fins from slats of an exhaust grating disposed in the exhaust portal.

7. In a tandem arrangement of vehicles including a towing vehicle and a towed vehicle, an assembly attached to the exterior of the towing vehicle for selectively orienting the flow of exhaust gas of the towing vehicle, the assembly comprising:

a transition shroud affixed to the exterior of the towing vehicle over an exhaust portal thereof;

a drum;

rollers and track connecting the drum to the shroud such that the drum is rotatable on the shroud;

means connected to the shroud for holding the drum in any of a set of rotational positions of the drum relative to the shroud;

fins encircled by the drum;

means for pivoting the fins relative to the drum;

means to lock the fins in a chosen one of a set of pivot positions relative to the drum; and means for imparting rotation to the drum and fins, the imparting means comprising flanges attached to the fins and disposed oblique thereto.

8. The assembly of claim 7 wherein the holding means comprises:

a plurality of members fixed to the shroud and disposed about the drum;

swing arms on the members;

a tab protruding from the drum;

means for connecting one of the swing arms to the tab.

9. The assembly of claim 8 wherein the shroud spaces the fins from slats of an exhaust grating disposed in the exhaust portal.

* * * * *